United States Patent
Garrett-Lindsey et al.

(10) Patent No.: US 10,004,332 B2
(45) Date of Patent: Jun. 26, 2018

(54) EXPANDABLE PROTECTOR FOR FURNITURE, AND RELATED METHODS AND SYSTEMS

(71) Applicants: Wallis Garrett-Lindsey, Kent, WA (US); Max Pham, Olympia, WA (US); Isaac Alexander, Gig Harbor, WA (US)

(72) Inventors: Wallis Garrett-Lindsey, Kent, WA (US); Max Pham, Olympia, WA (US); Isaac Alexander, Gig Harbor, WA (US)

( * ) Notice: Subject to any disclaimer, the term of this patent is extended or adjusted under 35 U.S.C. 154(b) by 0 days. days.

(21) Appl. No.: 15/255,393

(22) Filed: Sep. 2, 2016

(65) Prior Publication Data
US 2017/0071343 A1    Mar. 16, 2017

Related U.S. Application Data

(60) Provisional application No. 62/213,397, filed on Sep. 2, 2015.

(51) Int. Cl.
| | |
|---|---|
| *A47B 97/00* | (2006.01) |
| *A01M 29/30* | (2011.01) |
| *E06B 9/06* | (2006.01) |
| *A47C 31/10* | (2006.01) |
| *A47B 95/04* | (2006.01) |

(52) U.S. Cl.
CPC ............ *A47B 97/00* (2013.01); *A01M 29/30* (2013.01); *A47B 95/043* (2013.01); *A47C 31/10* (2013.01); *E06B 9/06* (2013.01)

(58) Field of Classification Search
CPC ........ A47B 97/00; A47C 31/10; A01M 29/30; B65D 5/48024; B65D 5/28; B65D 5/307; B65D 5/48028

USPC ...... 160/233, 84.01, 84.08, 135; 229/120.33, 229/120.24, 193; 150/158
See application file for complete search history.

(56) References Cited

U.S. PATENT DOCUMENTS

| | | | | | |
|---|---|---|---|---|---|
| 1,734,782 | A | * | 11/1929 | Stam ..................... | A47F 5/112 211/73 |
| 2,174,046 | A | * | 9/1939 | Smith .................... | A47C 31/11 150/158 |
| 2,318,711 | A | * | 5/1943 | Phelan ................... | A01C 1/02 229/194 |
| 3,849,932 | A | * | 11/1974 | Adams ................... | A01G 9/104 206/423 |

(Continued)

*Primary Examiner* — Blair M Johnson

(57) ABSTRACT

A shield for protecting furniture against damage that a pet can cause, includes a body and a lock. The body is expandable from a collapsed configuration to an expanded configuration by moving in a first direction a first end relative to a second end. When the body is in the expanded configuration and positioned adjacent furniture, the body can cover a region of the furniture. The lock includes a first portion and a second portion, and is operable to maintain the body in the expanded configuration when the first and second portions engage each other. With the shield's body in the collapsed configuration, one can easily transport the shield to any location. With the shield's body in the expanded configuration, one can cover a region of furniture with the body and thus discourage a pet from sitting or lying on top of the shield. With the body in the expanded configuration, the shield may also be used as a barrier to protect a leg or other vertical portion of a piece of furniture.

22 Claims, 7 Drawing Sheets

(56) References Cited

U.S. PATENT DOCUMENTS

| | | | | |
|---|---|---|---|---|
| 4,372,086 | A * | 2/1983 | Hanlon | A47F 5/112 160/135 |
| 4,600,142 | A * | 7/1986 | Quaintance | B65D 5/003 206/509 |
| 4,759,520 | A * | 7/1988 | Levine | A47G 5/00 160/114 |
| 4,865,106 | A * | 9/1989 | Wichelman | E06B 9/262 160/135 |
| 5,121,784 | A * | 6/1992 | Lennard | E06L 37/084 160/113 |
| 5,592,901 | A * | 1/1997 | Birmingham | A01K 15/024 119/706 |
| 5,842,746 | A * | 12/1998 | Rogers | A47C 27/008 182/196 |
| 5,960,848 | A * | 10/1999 | Schirer | G09F 15/0068 160/135 |
| 6,095,091 | A * | 8/2000 | Byrne | A01M 29/30 119/712 |
| 6,367,423 | B1 * | 4/2002 | Scheuer | A01K 1/035 119/706 |
| 6,692,594 | B1 * | 2/2004 | Pemberton | A01K 15/02 156/71 |
| 6,749,922 | B1 * | 6/2004 | Waselewski | A47C 5/005 150/158 |
| 8,245,668 | B1 * | 8/2012 | Alberti | A01K 1/035 119/712 |
| 9,604,751 | B2 * | 3/2017 | Baryshyan | B65D 5/5076 |
| 2003/0150566 | A1 * | 8/2003 | Ciano | B60J 11/00 160/135 |
| 2005/0098273 | A1 * | 5/2005 | DeBoard, II | A01K 1/035 160/136 |
| 2008/0277994 | A1 * | 11/2008 | Gray | A01K 1/035 297/463.2 |
| 2017/0071343 | A1 * | 3/2017 | Garrett-Lindsey | A47B 97/00 |

* cited by examiner

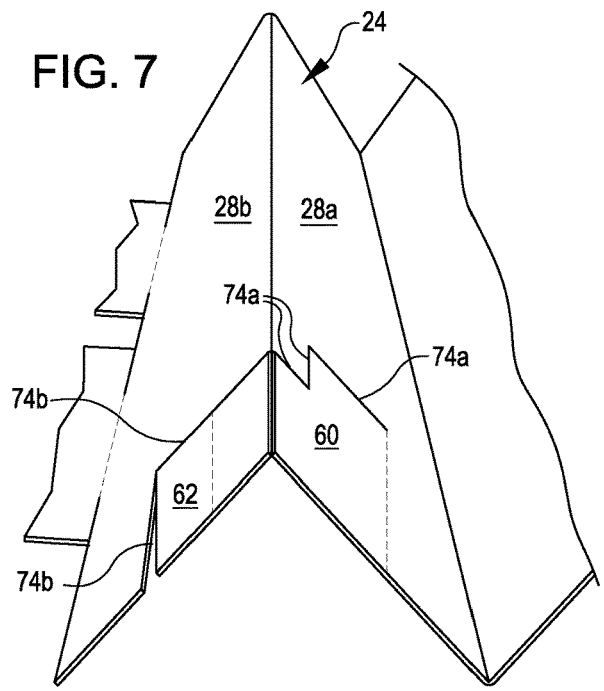
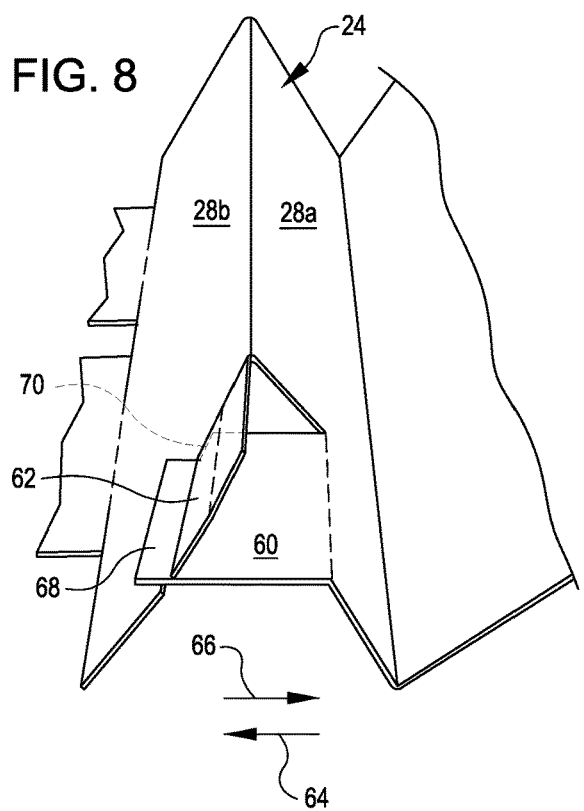

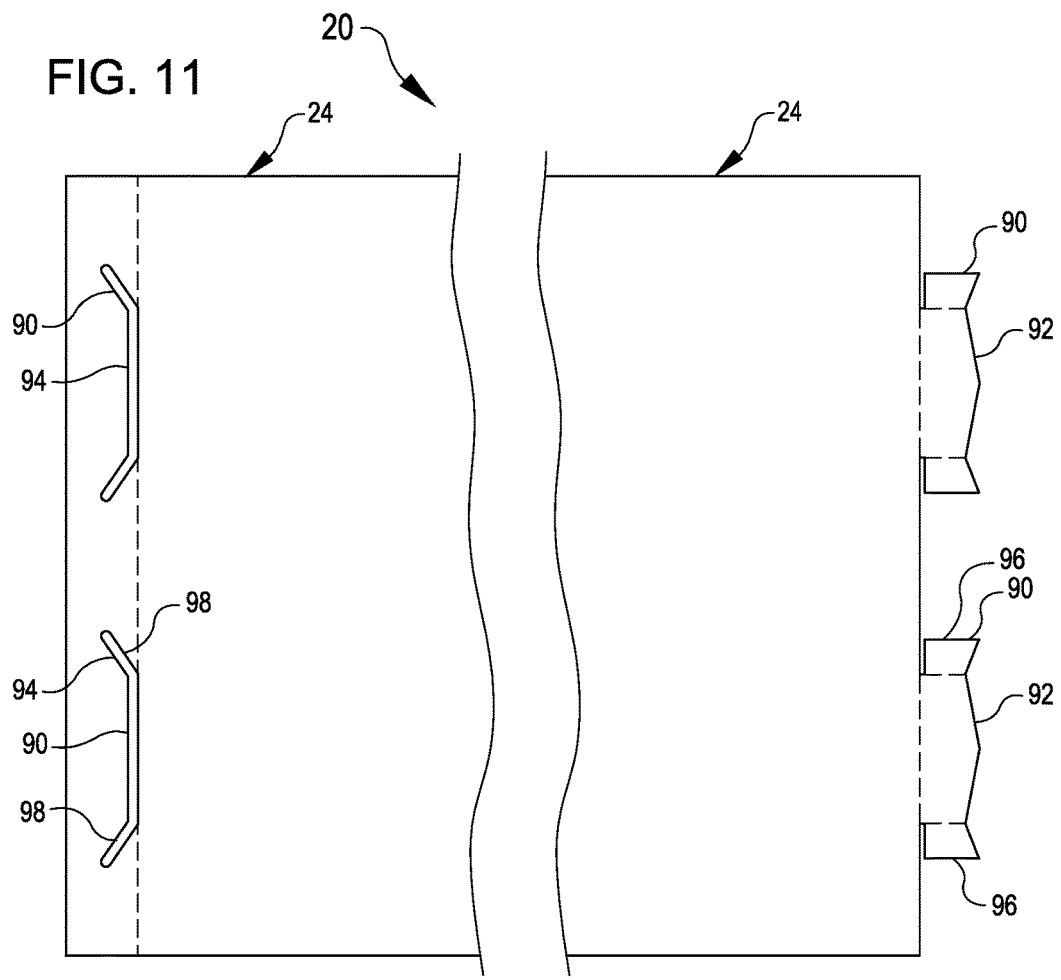
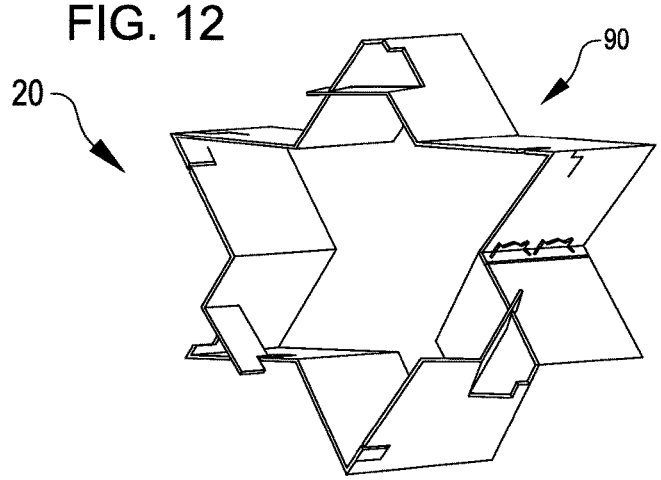

EXPANDABLE PROTECTOR FOR FURNITURE, AND RELATED METHODS AND SYSTEMS

CROSS REFERENCE TO RELATED APPLICATION AND CLAIM OF PRIORITY

This application claims priority from the commonly owned U.S. Provisional Patent Application 62/213,397 filed 2 Sep. 2015, and titled "EXPANDABLE FURNITURE PROTECTION SYSTEM", incorporated by reference.

BACKGROUND

Pets, such as cats, dogs and ferrets, often enjoy sitting and/or lying on one's couch or chair. When they do this, they often leave hair, dander and/or dirt on the couch or chair after they leave. If the cat is particularly territorial, he/she might urinate on the furniture to mark the area as his/hers. If the cat or dog is sick or healing a wound, they might leave behind other bodily fluids. Over time, this can cause the couch or chair and the room that the couch or chair is in to smell, and if guests come to visit and sit on the couch or in the chair, their clothes will pick-up the hair, dander, dirt, and absorb the other bodily fluids.

To discourage pets from lounging on one's couch, chair or other furniture, or from walking on a counter or table, many types of protection systems have been developed. Unfortunately, many of these protection systems are cumbersome to place on and remove from the furniture to be protected, often need laundering, or cause shock or pain to pets, and are not flexible or reconfigurable and thus unable to protect different types and styles of furniture.

SUMMARY

In one aspect of the invention, a shield for protecting furniture against damage that a pet can cause, includes a body and a lock. The body is expandable from a collapsed configuration to an expanded configuration by moving in a first direction a first end relative to a second end. When the body is in the expanded configuration and positioned adjacent furniture, the body can cover a region of the furniture. The lock includes a first portion and a second portion, and is operable to maintain the body in the expanded configuration when the first and second portions engage each other.

With the shield's body in the collapsed configuration, one can easily transport the shield to any location. With the shield's body in the expanded configuration, one can cover a region of furniture with the body and thus discourage a pet from sitting or lying on top of the shield. With the body in the expanded configuration, the shield may also be used as a barrier to protect a leg or other vertical portion of a piece of furniture.

BRIEF DESCRIPTION OF THE DRAWINGS

Each of FIGS. 1, 2 and 3 shows a view of a shield in an expanded configuration protecting a piece of furniture, according to an embodiment of the invention.

Figure 5:
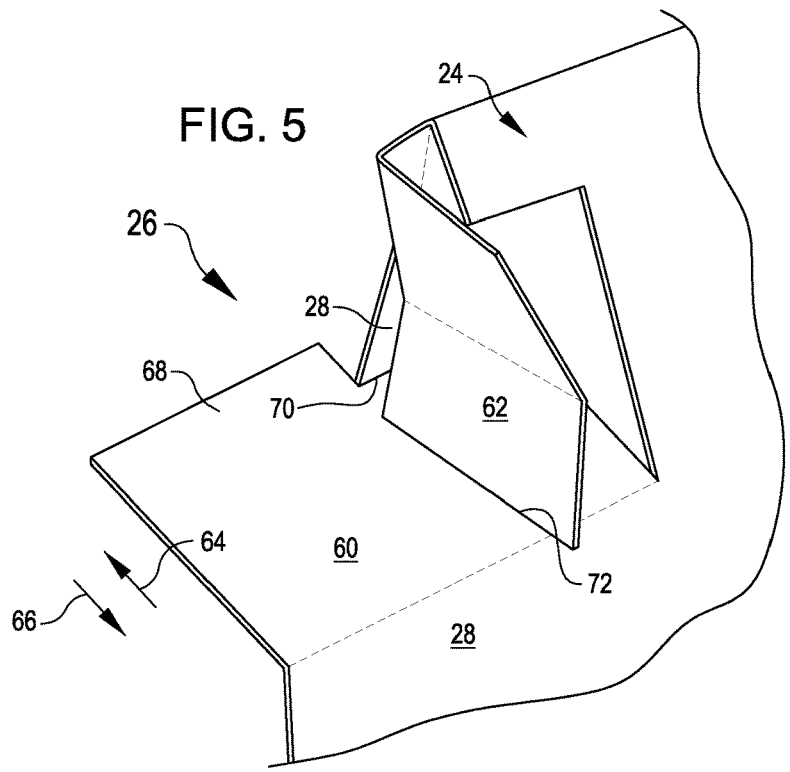
FIG. 5 shows a perspective view of a lock of the shield in FIGS. 1, 2 and 3 that maintains the shield in an expanded configuration, according to an embodiment of the invention.

Each of FIGS. 6-9 shows a view of the lock shown in FIG. 5 at a step in a process for engaging the lock to maintain the shield in an expended configuration, according to an embodiment of the invention.

Figure 10:
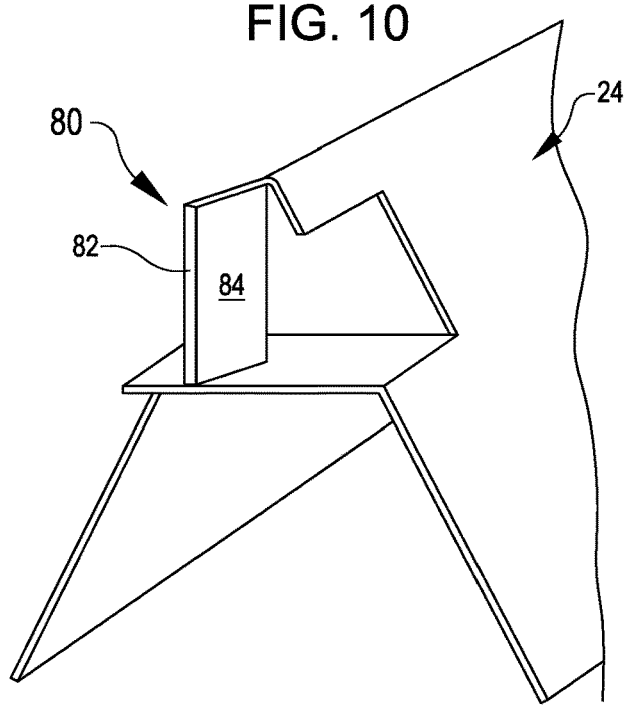

FIG. 10 shows a view of a lock, according to another embodiment of the invention.

FIG. 11 shows a view of a coupler of a shield that may be used to fasten the shield's body to another shield's body to increase the size of the shield, according to another embodiment of the invention.

Figure 1:
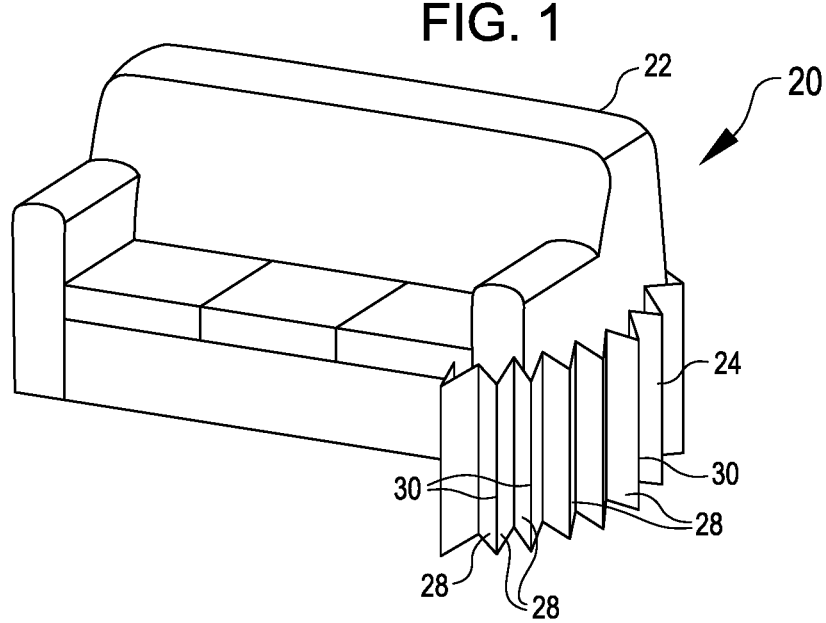
Figure 2:
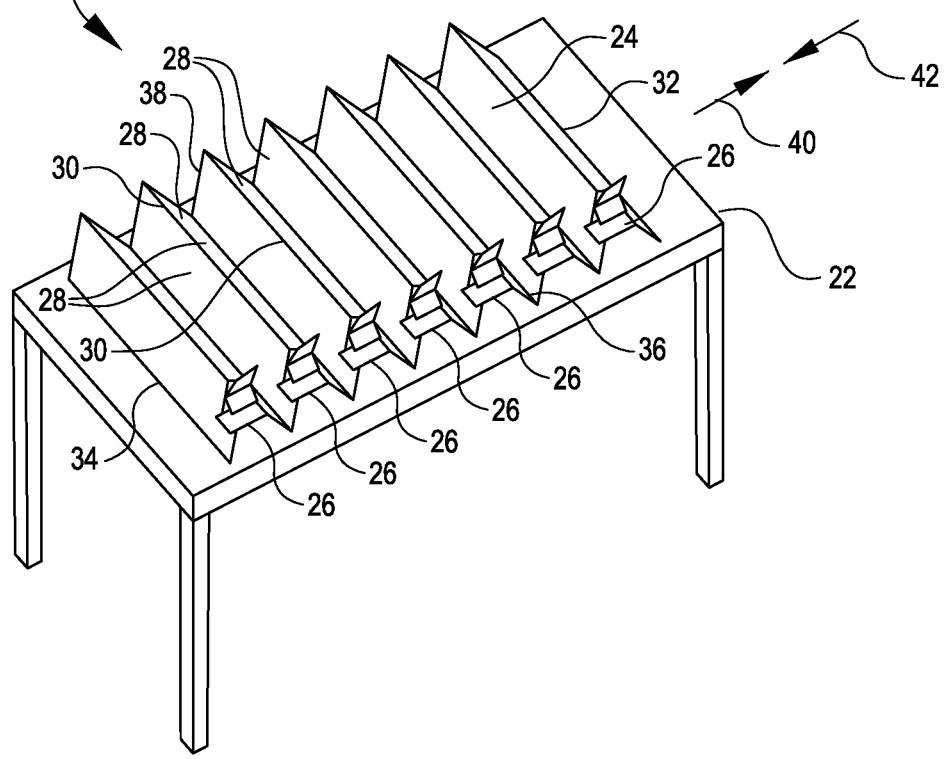
Figure 3:
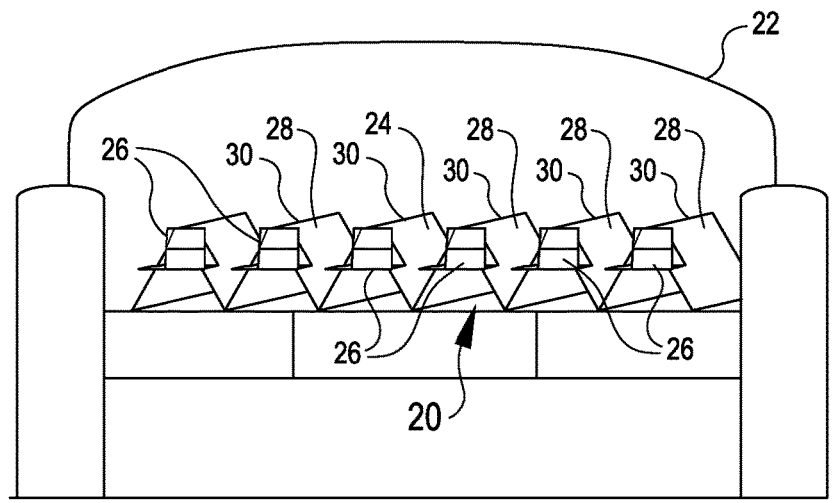

FIG. 12 shows a view of the shield in FIGS. 1, 2 and 3 configured to surround a piece of furniture, according to another embodiment of the invention.

Figure 13:
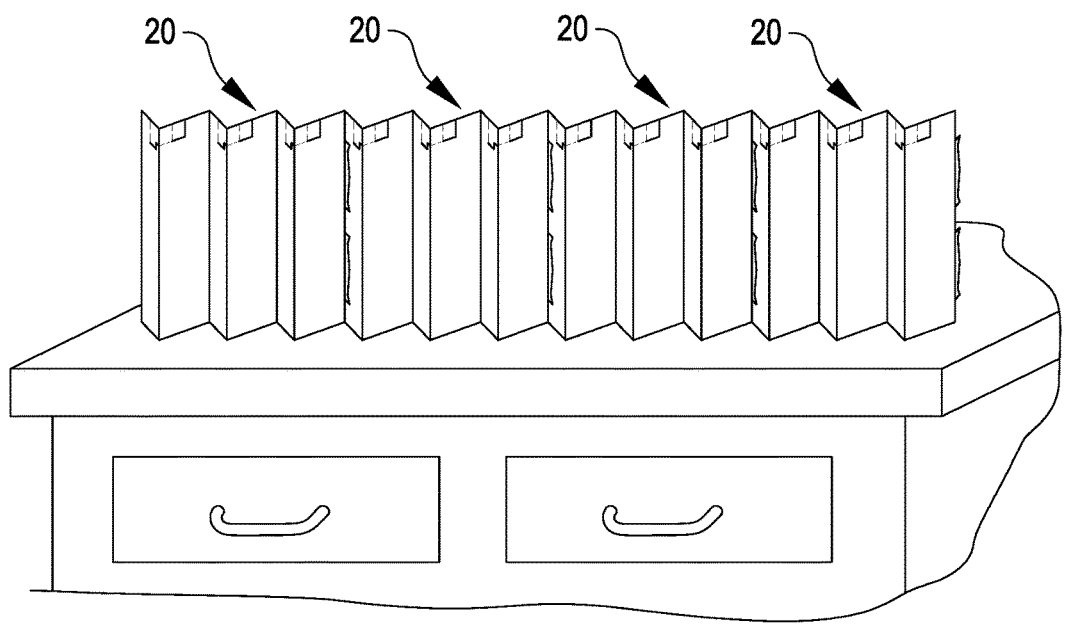

FIG. 13 shows a view of three shields fastened together and positioned on a counter top, according to another embodiment of the invention.

DETAILED DESCRIPTION

Each of FIGS. 1, 2 and 3 shows a view of a shield 20 in an expanded configuration protecting a piece of furniture 22, according to an embodiment of the invention. The furniture 22 may be any desired furniture that one wants to protect, such as a couch (FIGS. 1 and 3), a table (FIG. 2), a chair, a counter-top, a window-sill, a bed, or a leg or side of a couch, table, chair, bed or lamp. The shield 20 includes a body 24 and a lock 26 (discussed in greater detail in conjunction with FIGS. 5-9). The body 24 is expandable to an expanded configuration as shown in FIGS. 1, 2 and 3, and collapsible to a collapsed configuration (shown in FIG. 4). The lock 26, when engaged, holds or maintains the body 24 in the expanded configuration to make it difficult for a pet, such as a dog, cat or ferret, to change the configuration of the shield's body 24.

With the shield's body 24 in the collapsed configuration, one can easily transport the shield 20 to any location where a piece of furniture 22 that one would like to protect is located. With the shield's body 24 in the expanded configuration, one can cover a region of furniture with the body 24. If the covered region is a horizontal portion of the furniture, such as the region where one sits or lies, then the shield 20 discourages a pet from sitting or lying on the region. If the covered region is a vertical portion of the furniture, such as the leg or side of the furniture, then the shield 20 provides a barrier to protect the vertical portion from being sprayed, chewed, and/or clawed by a pet.

The body 24 may be designed to be expandable into one or more expanded configurations, as desired. For example, in this and other embodiments, the shield's body 24 includes a plurality of expanded configurations, and the lock 26 is configured to maintain the body 24 in one of the expanded configurations. More specifically, each expanded configuration has an area that, when the shield is used to protect a region of a piece of furniture, corresponds to the area of the furniture's region, and the difference between each expanded configuration is the size of its area. For example, in the collapsed configuration the body 24 has a small area. In the intermediate expanded configuration in which the lock 26 may maintain the body's configuration, the area of the expanded configuration is larger, here about 30 times larger, than the area of the collapsed configuration. And, in a fully expanded configuration, in which the body 24 resembles a flat plate, the area of the expanded configuration is larger, here about two times larger, than the intermediate expanded configuration's area.

Other embodiments are possible. For example, the body 24 may have two or more expanded configurations in which the lock 26 maintains the body 24 in each of the expanded configurations. This may be desirable to allow one to use the shield 20 to protect two different sized regions, such as the seat of chair and the seat of a couch, without having to use two different shields 20, each design specifically for a respective one of the regions. In other embodiments, the shield 20 may include a first lock that maintains the body 24 in a first expanded configuration, and a second lock that maintains the body 24 in a second expanded configuration.

Still referring to FIGS. 1, 2 and 3, the body 24 may have any desired shape that discourages a pet from resting on or otherwise contacting it when the body 24 is in an expanded configuration. For example, in this and other embodiments, the body 24 is rectangular in shape and includes a plurality of panels 28, each sharing a long side 30 with its adjacent neighbor and each pivotable relative to its adjacent neighbor along its respective, shared long side 30. The body 24 also includes a first end 32, a second end 34, a third end 36 and a fourth end 38. The first and second ends 32 and 34 are opposite each other; and the third and fourth ends 36 and 38 are opposite each other and disposed between the first and second ends 32 and 34. When the body 24 is in the collapsed configuration (FIG. 4), each of the panels 28 lies on top of its adjacent neighbor, and the first and second ends 32 and 34 are also adjacent each other. To expand the body 24 into one of its expanded configurations, one moves the first end 32 away from the second end 34 in the direction indicated by the arrow 40. This causes each of the panels 28 to pivot relative to its adjacent neighbor, and thus increases the area of the body 24 as the body is expanded toward an expanded configuration. When in the expanded configuration in which the lock 26 maintains the body's configuration, each of the panels 28 extends from its adjacent neighbor at an angle, here about forty degrees. This produces a sawtooth profile in the body 24 that discourages a pet from sitting or lying on the body 24. To expand the body 24 into its fully expanded configuration, one moves the first end 32 farther away from the second end 34 until each panel 28 extends from its adjacent neighbor at an angle of about 180 degrees. Although the fully extended configuration may not produce a profile that discourages a pet from sitting or lying on the body 24, the body 24 in the fully extended configuration may still provide a protective barrier for the region of the furniture that prevents bodily fluids and/or dirt from contacting the furniture. To collapse the body 24 into one of the other expanded configurations or into the collapsed configuration, one moves the first end 32 toward the second end 34 in the direction indicated by the arrow 42.

Other embodiments are possible. For example, the body may not be shaped to provide a sawtooth profile when the body is expanded into an expanded configuration, but rather, may be shaped to provide a two-dimensional arrangement of a plurality of bumps or small pyramids.

Still referring to FIGS. 1, 2 and 3, the body 24 may be made of any desired material. For example, in this and other embodiments, the body 24 includes cardboard. In other embodiments, the body 24 may include another sufficiently flexible material such as plastic or metal, that deforms elastically. In still other embodiments, the body 24 may include a combination of cardboard, plastic and/or metal.

Figure 4:
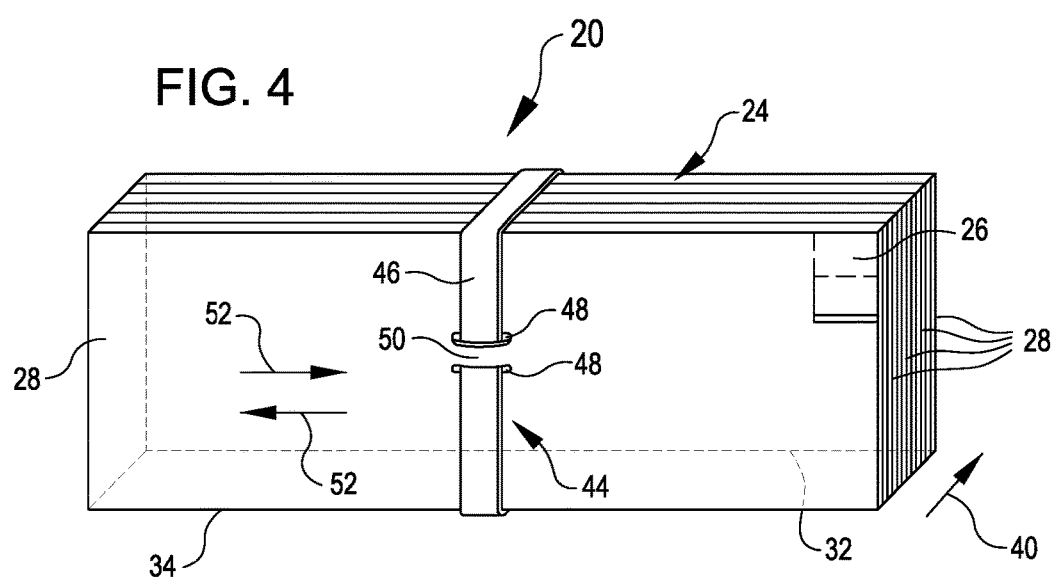
FIG. 4 shows a view of the shield in FIGS. 1, 2 and 3 in a collapsed configuration, according to an embodiment of the invention.

FIG. 4 shows a view of the shield 20 in FIGS. 1, 2 and 3 in a collapsed configuration, according to an embodiment of the invention. In the collapsed configuration the shield 20 is compact and easy to carry to other locations, or store for future use. As previously discussed, the shield 20 includes a lock 26, and the shield's body may be expanded by moving the first end 32 of the body 24 away from the second end 34 in the direction of the arrow 40.

The shield 20 may also include a second lock 44 to hold or maintain the body 24 in the collapsed configuration. For example, in this and other embodiments, the second lock 44 includes a strap 46 that is sized to wrap around the body 24 when the panels 28 lie adjacent each other. The strap 46 includes a Velcro® coupler to prevent the strap 46 from releasing its wrap around the body 24 and thus allowing the body to be easily expanded. To keep the strap coupled to the body 24, one of the panels 28 includes two slots 48 each sized to allow the strap 46 to extend through it. When the strap 46 extends through each slot 48 as shown in FIG. 4, the portion 50 of the panel 28 prevents the strap 46 from moving in the directions indicated by the arrows 52.

FIG. 5 shows a perspective view of the lock 26 of the shield 20 in FIGS. 1, 2 and 3 engaged to maintain the shield 20 in an expanded configuration, according to an embodiment of the invention. Each of FIGS. 6-9 shows a partial view of the shield 20 at a step in a process for engaging the lock 26 shown in FIG. 5 to maintain the shield in an expanded configuration, according to an embodiment of the invention.

The lock 26 may be configured as desired to hold or maintain the body 24 in an extended configuration. For example, in this and other embodiments, the lock 26 includes a first portion 60 and a second portion 62. The first portion 60 includes a first region of one of the panels 28 of the body 24, and is pivotable relative to the remainder of the panel 28. The second portion 62 includes a second region of an adjacent panel 28 of the body 24, and is pivotable relative to the remainder of the respective panel 28. When the first and second portions 60 and 62 engage each other as shown in FIG. 5, the first portion 60 resists movement of the first end (32 in FIGS. 1-4) in the direction of the arrow 64, which is the direction that would collapse the body 24, and the second portion 62 resists movement of the first end in the direction of the arrow 66, which is the direction that would expand the body 24. More specifically, the first portion 60 includes a tab 68 that extends over the panel 28 that includes the second portion 62, and a contact pad 70 that contacts the panel 28 that includes the second portion. When the first portion 60 is positioned as shown in FIG. 5 and one attempts to move the first end in the direction 64, the contact pad 70 bumps against the panel 28 to resist the movement. The second portion 62 includes an end 72 that contacts the lock's first portion 60. When the second portion 62 is positioned as shown in FIG. 5 and one attempts to move the first end in the direction 66, the end 72 contacts the lock's first portion 60 to resist the movement.

Other embodiments are possible. For example, the lock 26 may include a pin that engages a hole in each of the adjacent panels 28. When the body is in the desired extended position, one inserts the pin into each of the holes, such that the pin couples the two adjacent panels. To resist the movement of the first end in the direction of the arrow 64, the pin carries a compressive load; and to resist movement of the first end in the direction of the arrow 66, the pin carries a tensile load.

Figure 6:
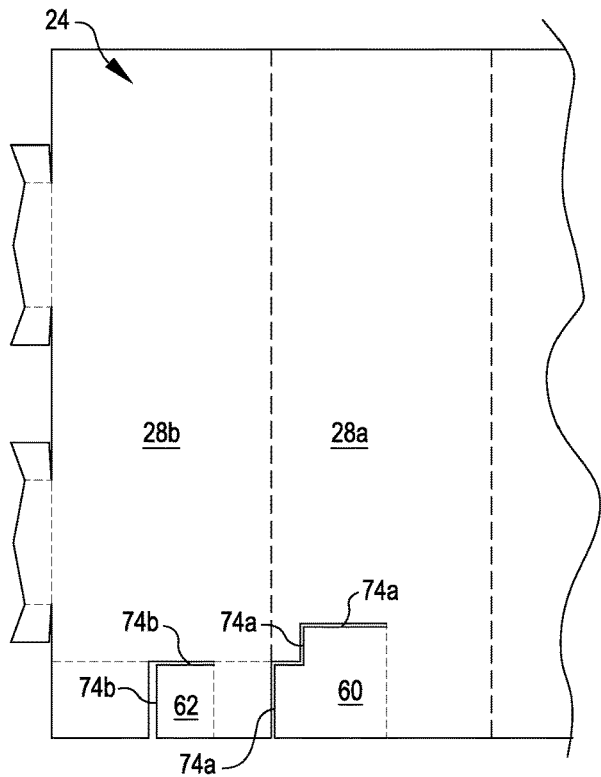

FIG. 6 shows a partial view of the shield's body 24 in the fully expanded configuration, before one configures the body 24 into the expanded configuration that the lock 26 will hold or maintain. In this configuration, the panel 28a includes the first portion 60, and the panel 28b includes the second portion 62. To allow each of the portions 60 and 62 to pivot relative to their respective panels 28a and 28b and engage each other, the panels 28a and 28b include cuts 74a and 74b.

FIG. 7 shows a partial view of the shield's body 24 with the panel's 28a and 28b pivoted relative to the each other to help place the body 24 into the expanded configuration that the lock 26 will hold or maintain.

FIG. 8 shows a partial view of the shield's body 24 with the panel's 28a and 28b pivoted relative to the each other, and the first portion 60 pivoted relative to the remainder of the panel 28a. At this step, the lock 26 resists the movement of the body's first end 32 (FIGS. 1-4) in the direction of the arrow 64, but does not resist movement of the first end in the direction of the arrow 66.

Figure 9:
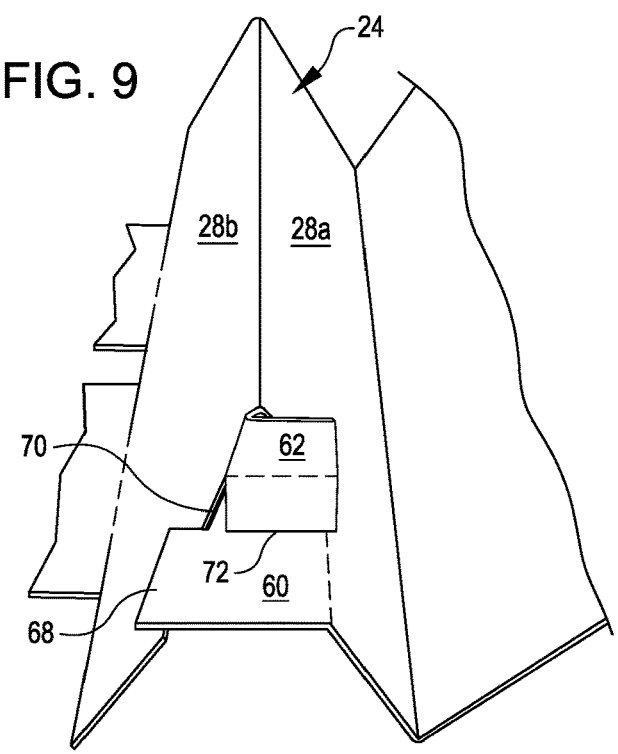

FIG. 9 shows a partial view of the shield's body 24 with the panel's 28a and 28b pivoted relative to the each other, the first portion 60 pivoted relative to the remainder of the panel 28, and the second portion pivoted relative to the remainder of the panel 28b. At this step, the lock 26 resists the movement of the body's first end 32 (FIGS. 1-4) in the direction of the arrow 64 and the direction of the arrow 66.

FIG. 10 shows a view of a lock 80, according to another embodiment of the invention. The lock 80 is similar to the lock 26 except that the lock 80 also includes a stiffener 82 that may be releasably or permanently fixed to the second portion 84. The stiffener 82 helps the second portion's material and geometry resist the compressive load that the second portion 84 carries when one attempts to move the body's first end (32 in FIGS. 1-4) in the direction indicated by the arrow 66, and helps prevent the second portion 84 from excessive bending under the compressive load. The stiffener 82 may be any desired material capable of providing such additional rigidity. For example, in this and other embodiments, the stiffener 82 includes a narrow strip of plastic that is glued to the edge of the second portion 84. In other embodiments the stiffener 82 includes a metal or the same material as that the second portion includes, such as cardboard. In still other embodiments, the stiffener 82 may be wider than that show in FIG. 10 and may be located elsewhere on the second portion 84.

FIG. 11 shows a view of a coupler 90 of a shield 20 that may be used to fasten the shield's body 24 to another shield's body 24 to increase the size of the shield 20, according to another embodiment of the invention. Coupler 90 may be configured as desired. For example, in this and other embodiments, the coupler 90 includes two tongues 92 and two receivers 94. To couple the body 24 of a shield 20 with another body 24 of another shield 20, one inserts each of the tongues 92 into a respective one of the receivers 94 by pivoting the two tabs 96 to align with the angled portions 98 of the receiver 94. Once inserted, one pivots the tabs 96 back to their original position, out of alignment with the angled portions 98. In this configuration, the tabs 96 resist the separation of the two bodies 24.

FIG. 12 shows a view of the shield 20 in FIGS. 1, 2 and 3 configured to surround a piece of furniture, according to another embodiment of the invention. In this configuration, a table's leg may be positioned inside the perimeter of the shield 20. To help maintain the shield in this configuration, each of the tongues 92 (FIG. 11) of the shield's coupler 90 may be inserted a respective one of the receivers 94 (FIG. 11) of the shield's coupler 90.

FIG. 13 shows a view of three shields 20 fastened together and positioned on a counter top, according to another embodiment of the invention. In this configuration, each of the shield's locks 26 (FIGS. 5-9) are not engaged to hold or maintain the expended configuration of each shield 20, and each shield's coupler 90 (FIG. 11) fastens each shield's body 24 to another shield's body to form a single, long shield.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A shield for protecting furniture against damage that a pet can cause, the shield comprising:
a body operable to cover a region of a piece of furniture, the body expandable from a collapsed configuration to an expanded configuration by moving a first end relative to a second end in a first direction, wherein when the body is in the expanded configuration and positioned adjacent furniture, the body covers a region of the furniture; and
a lock having a first portion and a second portion, and operable to maintain the body in the expanded configuration when the first and second portions engage each other, wherein:
the first portion includes a first region of the body that is pivotable relative to the body,
the second portion includes a second region of the body that is adjacent the first region and that is pivotable relative to the body, and
when the first and second portions engage each other to maintain the body in an expanded configuration, the first portion resists movement of the first end relative to the second end in a direction that would collapse the body, and the second portion resists movement of the first end relative to the second end in the direction that would expand the body.

2. The shield of claim 1 wherein when the body is in an expanded configuration and positioned on a piece of furniture, the body discourages a cat from lying on the region of the piece of furniture that the body covers.

3. The shield of claim 1 wherein when the body is in an expanded configuration and positioned adjacent a piece of furniture, the body prevents spray from a cat from contacting the region of the piece of furniture that the body covers.

4. The shield of claim 1 wherein the body includes:
a single collapsed configuration having an area, and
a plurality of expanded configurations each having an area that is larger than the area of the collapsed configuration.

5. The shield of claim 1 wherein the body includes a rectangular shape in the expanded configuration.

6. The shield of claim 1 wherein the body includes a rectangular shape in the collapsed and expanded configurations.

7. The shield of claim 1 wherein:
the body includes a rectangular shape, and
when the body is in the expanded configuration, the first and second ends define two opposing sides of the rectangular shape, and a third and fourth end define two opposing sides each lying between the first and second ends and each longer in length than the first and second ends.

8. The shield of claim 1 wherein the body includes a plurality of panels each having a short side and a long side, the panels being arranged such that each panel shares its long side with its adjacent neighbor, and is pivotable relative to its adjacent neighbor along the long side so that when the body is in the collapsed configuration, each panel lies on its adjacent neighbor.

9. The shield of claim 1 wherein the body includes a material that elastically deforms when an animal contacts the body.

10. The shield of claim 1 wherein the first portion includes a region of the body that is pivotable relative to the body.

11. The shield of claim 1 wherein the second portion includes a region of the body that is pivotable relative to the body.

12. The shield of claim 1 wherein:
the first portion includes a tab and a contact pad, and when the first portion and second portion engage each other to maintain the body in the expanded configuration, the tab extends over the body and the contact pad contacts the body to resist movement of the body toward the collapsed configuration; and
the second portion includes an end that when the first portion and second portion engage each other to maintain the body in the expanded configuration, the end contacts the first portion to resist movement of the body toward the expanded configuration.

13. The shield of claim 1 further comprising a second lock operable to maintain the body in the collapsed configuration.

14. The shield of claim 1 further comprising a coupler operable to fasten another body to the body.

15. A method for protecting furniture against damage that a pet can cause, the method comprising:
positioning a body of a shield adjacent a region of a piece of furniture;
adjusting the size of the body to cover the region of the piece of furniture; and
locking the body at the adjusted size to maintain the adjusted size of the body while a pet contacts the shield or attempts to contact the piece of furniture, wherein locking the body includes:
pivoting a first portion of a lock to engage a region of the body; and
pivoting a second portion of a lock to engage the first portion on the lock.

16. The method of claim 15 wherein positioning the body includes positioning the body adjacent a vertical portion of a piece of furniture.

17. The method of claim 15 wherein positioning the body includes positioning the body on top of a horizontal portion of a piece of furniture.

18. The method of claim 15 wherein positioning the body includes coupling two or more bodies together.

19. The method of claim 15 wherein adjusting the size of the body includes expanding the body.

20. The method of claim 15 wherein adjusting the size of the body includes collapsing the body.

21. The method of claim 15 wherein locking the body includes:
a contact pad of a first portion of a lock contacting the body to resist movement of the body toward a collapsed configuration; and
an end of a second portion of a lock contacting the first portion of the lock to resist movement of the body toward an expanded configuration.

22. A method for protecting furniture against damage that a pet can cause, the method comprising:
positioning a body of a shield adjacent a region of a piece of furniture;
adjusting the size of the body to cover the region of the piece of furniture; and
locking the body at the adjusted size to maintain the adjusted size of the body while a pet contacts the shield or attempts to contact the piece of furniture, wherein locking body includes:
a contact pad of a first portion of a lock contacting the body to resist movement of the body toward a collapsed configuration, and
an end of a second portion of a lock contacting the first portion of the lock to resist movement of the body toward an expanded configuration.

* * * * *